UNITED STATES PATENT OFFICE.

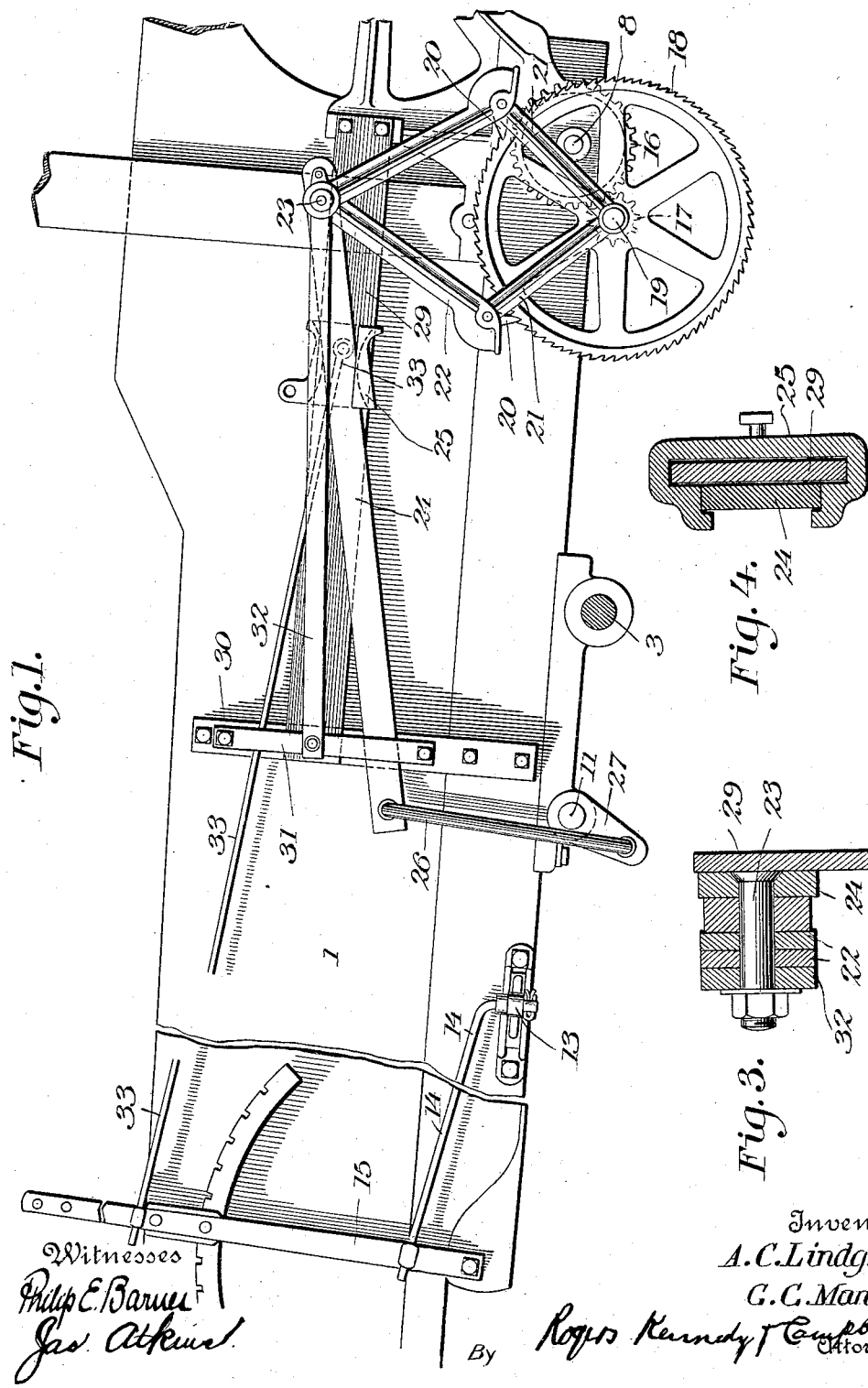

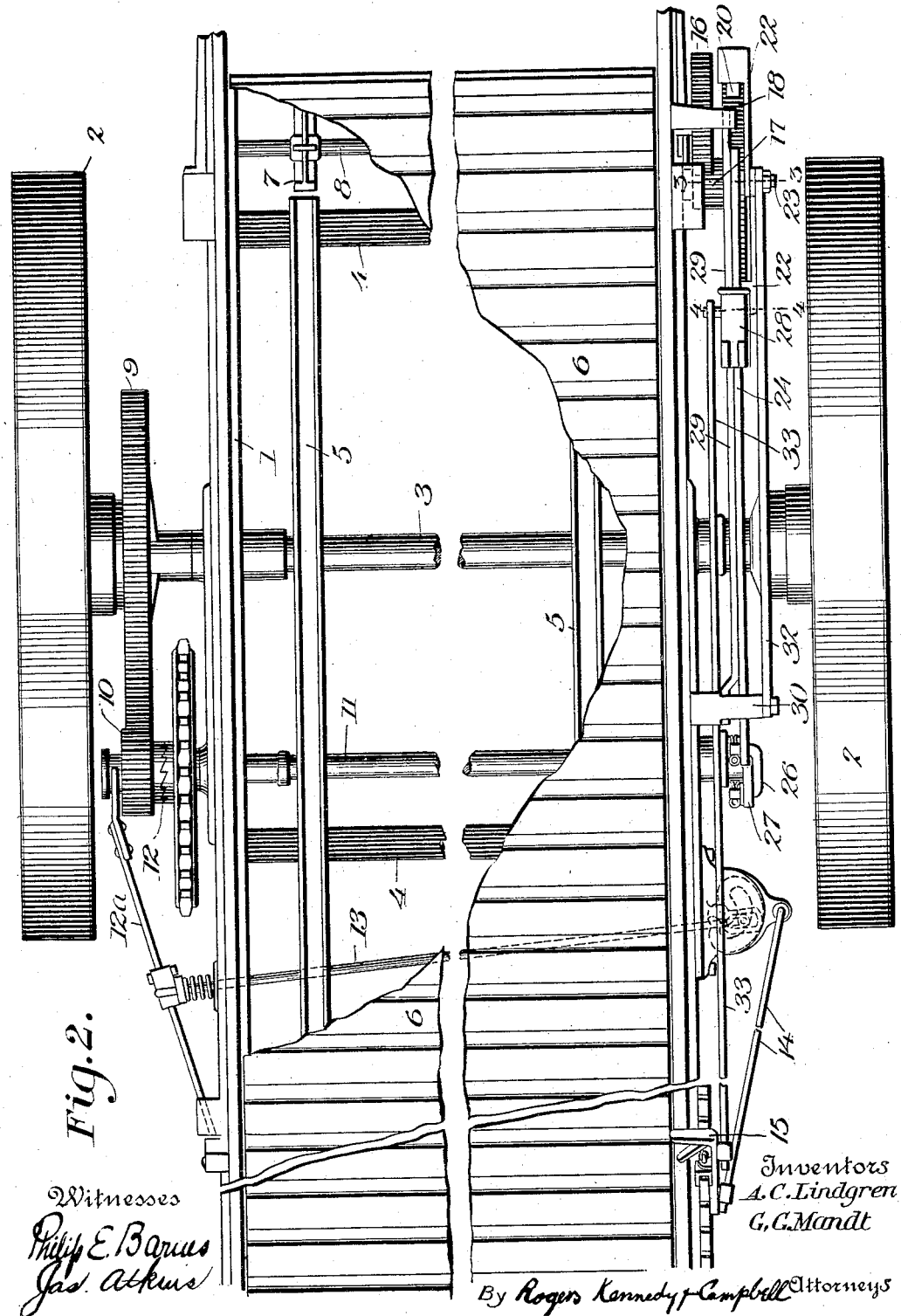

ALEXUS C. LINDGREN AND GUNDER G. MANDT, OF MOLINE, ILLINOIS, ASSIGNORS TO MOLINE PLOW COMPANY, A CORPORATION OF ILLINOIS.

INTERMITTENTLY-OPERATING DRIVING MECHANISM.

1,170,832.     Specification of Letters Patent.     Patented Feb. 8, 1916.

Original application filed December 20, 1909, Serial No. 533,992. Divided and this application filed November 17, 1913. Serial No. 801,520.

*To all whom it may concern:*

Be it known that we, ALEXUS C. LINDGREN and GUNDER G. MANDT, citizens of the United States, residing at Moline, in the county of Rock Island and State of Illinois, have invented certain new and useful Improvements in Intermittently - Operating Driving Mechanism, of which the following is a specification, reference being had therein to the accompanying drawing.

This invention relates to mechanism for intermittently actuating a traveling load-carrying instrumentality and is especially applicable to the movable bottom or apron of a manure spreader.

The present application is a division of an application filed by us December 20th, 1909, Serial No. 533,992.

The object of the invention is to provide efficient mechanisms for feeding the load-carrying instrumentality toward a point of discharge and for predeterminately varying the speed at which the instrumentality travels and, thereby, vary the quantity of material distributed.

The invention resides, primarily, in combining with an endless load-carrying apron, means for movably supporting the same, means for actuating the apron, and means for controlling it at all times; whereby its operation may be effected and its rate of travel be instantly and conveniently changed to cause the apron to deliver any predetermined quantity of material to a beater within a given time.

While we have herein referred to our invention as applicable to operating the load-carrying aprons of manure spreaders, it is to be understood that it may be employed in other connections, and that it is the intention herein to claim the invention broadly and as applicable for whatever use it may be suitable.

In the accompanying drawings: Figure 1 is a fragmentary view, in elevation of a manure spreader structure with our invention applied thereto; Fig. 2 is a fragmentary view in plan, partly in section, thereof; Fig. 3 is a view in vertical section, on the line 3—3, Fig. 2; and Fig. 4 is a similar view on the line 4—4, Fig. 2.

In the particular application of our invention to manure spreaders as herein shown, the parts are mounted on a wagon-body 1 which is supported on ground-wheels, two of which, 2, are illustrated. These wheels are connected by an axle 3 which constitutes the primary driving instrumentality of our invention.

Upon cross-beams 4 are secured longitudinal channel-bars 5 for supporting and guiding an endless load-carrying apron 6. The apron, as usual, forms the bottom of the wagon-body and when in motion delivers its load to a beater-cylinder (not shown) disposed at the rear end of the wagon and by which the material is distributed, and may be constructed in any suitable manner. At the front and rear ends of the wagon-body, the apron passes around and is engaged by suitable sprocket-wheels, those at the rear appearing in the drawings and marked 7. These sprockets 7 are carried by a transverse shaft 8 mounted in appropriate bearings.

Mounted on the axle 3, between one of the ground-wheels and the wagon-body, is a driving-gear 9 arranged to mesh with a pinion 10 shiftably mounted on a counter-shaft 11 disposed in suitable bearings at the sides of the wagon-body. This pinion may be connected to the shaft by means of a clutch 12 operated by a shifter-rod 12ª that connects, through a spring-pressed arm 13, with a connecting-rod 14 attached at its front end to an operating and control-lever 15. The counter-shaft, when thus connected to the primary drive, is adapted to operate the apron-moving mechanism now to be described.

The sprocket-carrying shaft 8 is provided with a gear 16 with which meshes a pinion 17 carried by the hub of a ratchet-wheel 18 that is mounted on a stub-shaft 19 suitably supported on the wagon-body. The ratchet-wheel is adapted to be actuated by a pair of oppositely - disposed pawls 20. These are preferably pivotally mounted adjacent the free ends of two arms 21 pivotally mounted on the stub-shaft and capable of movement thereon to cause the pawls to engage the teeth of the ratchet and rotate the same. In this manner, the pinion 17 (connected to the ratchet) is actuated to drive the gear 16 and shaft 8. Preferably and as shown, the pawl-carrying arms 21 are connected to and operated by two other arms 22 which are pivoted at their upper ends on a bolt 23 located above the ratchet-wheel. The bolt 23 is mounted in the end of a rocking member or walking-beam 24 which is sustained intermediate of its ends by a shiftable block or fulcrum-element 25 and adapted to be rocked on said element by a connecting-link 26 attached to it at the end opposite its connection with the arms 22. This link is connected to and receives motion from a crank 27 mounted on the end of the counter-shaft 11. The fulcrum-element 25 is mounted (for a shifting movement) on a support 29 secured at one end to an upright bracket 28 (arranged on the side of the wagon-body) and extending forward to a point near the end of the counter-shaft where it is secured to another upright bracket 30. Between this bracket and a rub-iron 31 the end of the walking-beam is guided and held against lateral displacement. Extending between the rub-iron 31 and the bolt 23 is a bar 32 by which the parts are maintained in operative position. The fulcrum-element 25 is, by a forwardly-extending rod 33, connected to and shifted by the control-lever 15 disposed at the front end of the wagon-body.

As will now be seen, the arrangement of the parts is such that a predetermined forward movement of the control-lever 15 acts (through the connecting-rod 14, arm 13, shifter-rod 12ª and clutch 12) first, to connect the primary driving-instrumentalities; and, then, by its continued movement and through said rod 33, to shift the fulcrum-element on its support and thereby change its position in relation to the ends of the walking-beam and with respect to the ratchet-wheel and the crank-operated arm. In consequence, the fulcrum of the walking-beam is shifted and this causes the beam to rock (through the action of the crank-operated link) in a wider angle, and, thus, to have a greater movement in relation to the arms that operate the pawls which actuate the ratchet-wheel. As a result of the initial movement of the lever 15, the driving parts are connected, whereupon the apron drive-shaft is given an intermittent rotative movement to actuate the apron, causing it to present its load to the aforementioned beater-cylinder. Obviously, the farther forward the control-lever is moved, the greater will be the angle of movement of the walking-beam with consequent increase in speed of travel of the apron, with the result that a greater amount of material is presented to the beater-cylinder in a given time. By means of the single control-lever 15, therefore, the driving parts are brought into operation and the quantity of material distributed by the machine is definitely controlled and predetermined. The range of feed of the material may, thus, be varied approximately from one to thirty loads per acre, more or less, according to the quality and kind of material being handled.

From the foregoing description, it will be seen that we have succeeded in devising a feeding mechanism which is well adapted to achieve the several objects and ends in view. The structure is simple and compact in form and is particularly well adapted for manure spreaders and the like.

As many changes may be made in the construction and widely different embodiments of the invention are possible without departing from the spirit thereof, it is intended that all matter contained in the foregoing description and shown in the accompanying drawings shall be interpreted as illustrative and not in a limiting sense.

What we claim is:

1. A transmission mechanism including a driving member; a driven member; and intermediate mechanism comprising a ratchet wheel operatively connected with said driven member; means for actuating said ratchet wheel; a support; a fulcrum member shiftably mounted on said support; a rocker arm mounted, intermediate its ends, on said fulcrum element, and pivotally connected at one end with said ratchet wheel actuating means; means for connecting the opposite end of said arm and said driving member; and means, connected with said ratchet wheel actuating means, for maintaining them in predetermined operative relation.

2. A transmission mechanism including a driving member; a driven member; and intermediate mechanism comprising a ratchet wheel operatively connected with said driven member; means for actuating said ratchet wheel; a support; a fulcrum member shiftably mounted on said support; a rocker arm mounted, intermediate its ends, on said fulcrum element, and pivotally connected at one end with said ratchet wheel actuating means; means for connecting the opposite end of said arm and said driving member; and a member having a fixed pivot at one end on said support; the other end being connected with said rocker arm and ratchet wheel actuating means.

3. A transmission mechanism including a driving member; a driven member; and intermediate mechanism comprising a ratchet wheel operatively connected with said driven member; means for actuating said ratchet wheel; a support; a fulcrum member shiftably mounted on said support; a rocker arm mounted, intermediate its ends, on said fulcrum element, and pivotally connected at one end with said ratchet wheel actuating means; means for connecting the opposite end of said arm and said driving member; means, connected with said rocker arm and ratchet wheel actuating means, for maintaining them in predetermined axial relation; and means for shifting said fulcrum on said support whereby the speed of said driven member is varied.

4. A transmission mechanism including a driving member; a driven member; and intermediate mechanism comprising a ratchet wheel operatively connected with said driven member; means for actuating said ratchet wheel; a support; a fulcrum member shiftably mounted on said support; a rocker arm mounted, intermediate its ends, on said fulcrum element, and pivotally connected at one end with said ratchet wheel actuating means; means for connecting the opposite end of said arm and said driving member; a member having a fixed pivot at one end on said support; the other end being connected with said rocker arm and ratchet wheel actuating means; and a controlling means connecting with said driving member and said fulcrum element to actuate one of said members and then the other.

5. A structure of the class described including a driving member; a driven member; driving mechanism for actuating said driving member; mechanism for transmitting motion between said driving and driven members comprising a rocking member, a shiftable fulcrum-element upon which said rocking member is supported, a ratchet-wheel, pawl-carrying arms supported on said rocking member and also on the axis of said ratchet-wheel, a crank-arm connecting with the opposite end of the rocking-member and with said driving member, connections between said ratchet-wheel and said driven-member; and a controlling member connecting with said driving and motion-transmitting mechanisms and shiftable to actuate one of said mechanisms and, then, the other.

6. A transmission mechanism including a primary drive shaft; a secondary drive shaft; driving connections between said shafts; a driven shaft; an intermediate connecting gear comprising a ratchet wheel mounted on an axle and operatively connected with said driven member; a support; a fulcrum element shiftably mounted on said support; a rocking arm mounted, intermediate its ends, on said fulcrum element; lazy-tongs having oppositely disposed toggles secured axially with said ratchet wheel, and to one end of said rocker arm respectively; ratchet actuating pawls disposed on the intermediate joints of said lazy-tongs in operative engagement with said ratchet wheel; a connection between the other end of said rocker arm and said drive shaft; a controlling device connected with said fulcrum whereby it may be shifted to vary the oscillation of the links of the lazy-tongs and control the speed of the driven member; a clutch mechanism interposed between said primary and secondary drive shafts; and a controlling device connecting said clutch mechanism and said fulcrum element to actuate first one member and then the other.

7. A transmission mechanism including a primary drive shaft; a secondary drive shaft; driving connections between said shafts; a driven shaft; an intermediate connecting gear comprising a ratchet wheel mounted on an axle and operatively connected with said driven member; a rocking arm mounted, intermediate its ends, on said fulcrum element; lazy-tongs having oppositely disposed toggles secured axially with said ratchet wheel, and to one end of said rocker arm respectively; ratchet actuating pawls primary and secondary drive shafts; a con- disposed on the intermediate joints of said lazy-tongs in operative engagement with said ratchet wheel; a connection between the other end of said rocker arm and said drive shaft; a controlling device connected with said fulcrum whereby it may be shifted to vary the oscillation of the lazy-tongs and control the speed of the driven member; a clutch mechanism interposed between said trolling device connecting said clutch mechanism and said fulcrum element to actuate first one member and then the other; and a single control lever connected with said clutch mechanism and said fulcrum element, and actuatable to operate on said clutch mechanism for a part of its stroke; and to shift said fulcrum element to vary the speed of the driven member during another portion of its stroke.

In testimony whereof we have affixed our signatures in presence of two witnesses.

ALEXUS C. LINDGREN.
GUNDER G. MANDT.

Witnesses to signature of Alexus C. Lindgren:
T. C. BLANDING,
JAMES J. LAMB.

Witnesses to signature of Gunder G. Mandt:
CHAS. A. CADWELL,
EDW. ENGEBUTSON.

Copies of this patent may be obtained for five cents each, by addressing the "Commissioner of Patents, Washington, D. C."